Figure 1:
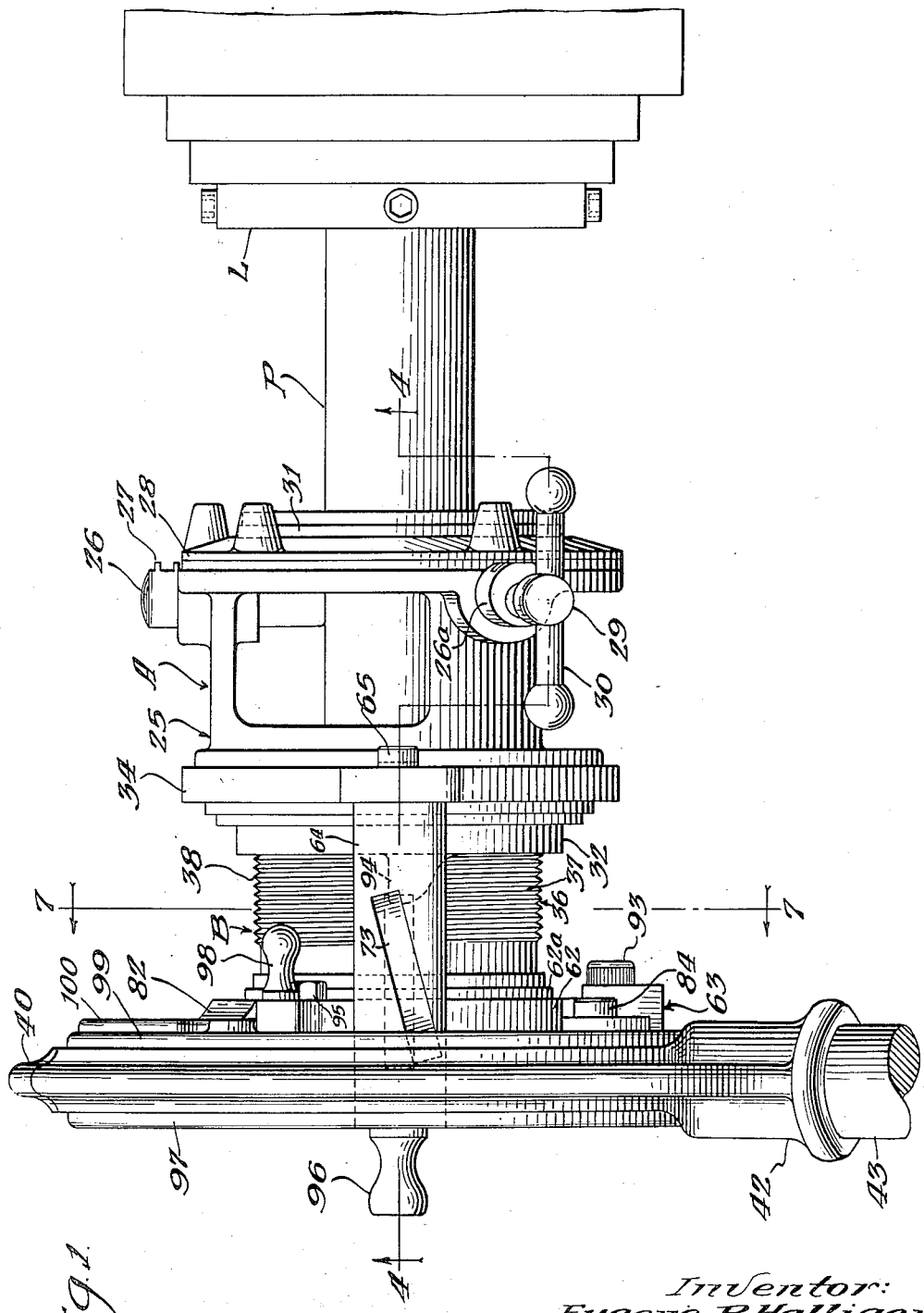

March 3, 1953 — E. P. HALLIGAN — 2,629,886
THREAD CUTTER
Filed Jan. 19, 1950 — 7 Sheets-Sheet 1

Inventor:
Eugene P. Halligan
By: Schroeder, Merriam,
Hofgren & Brady
Attorneys

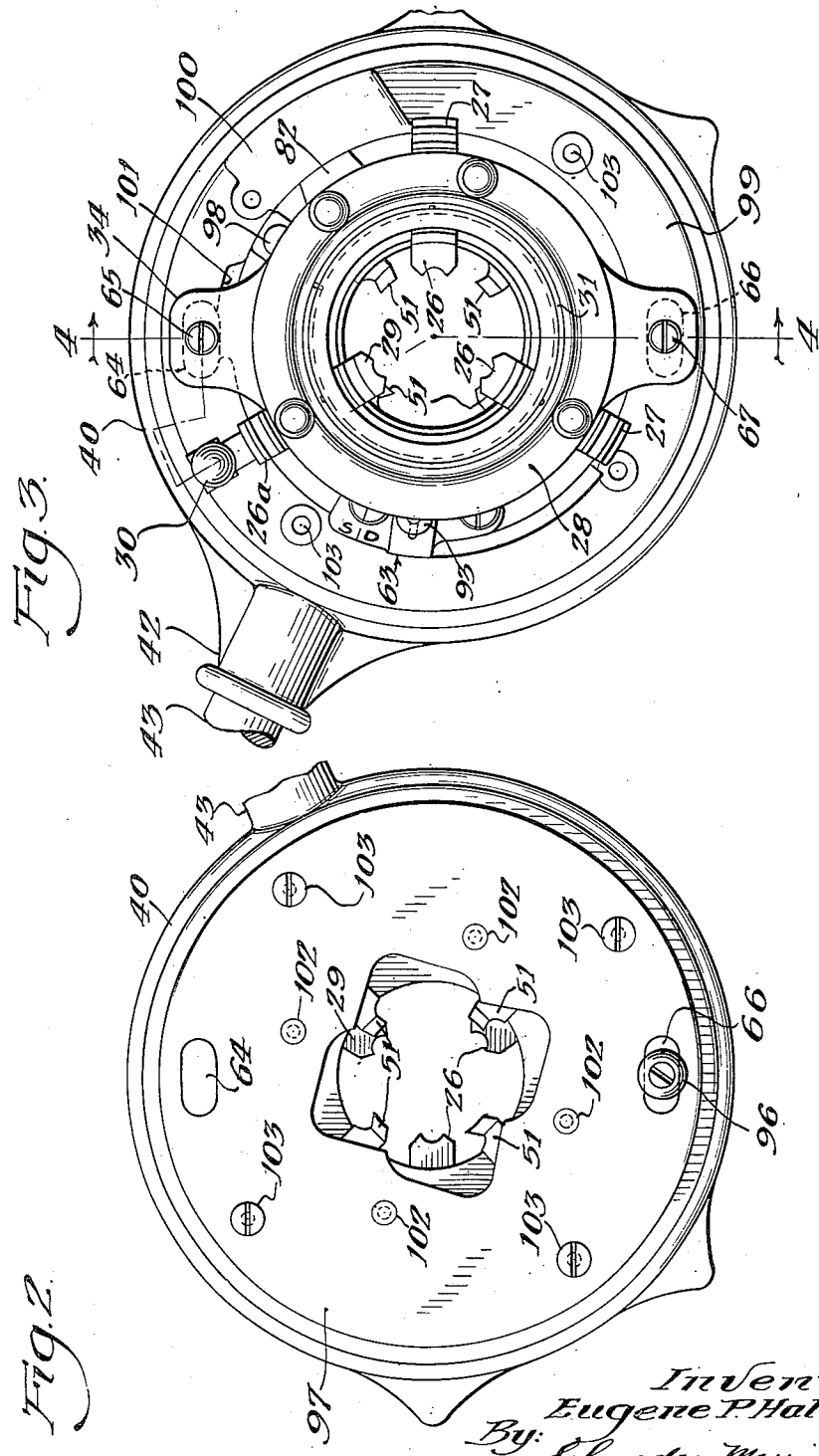

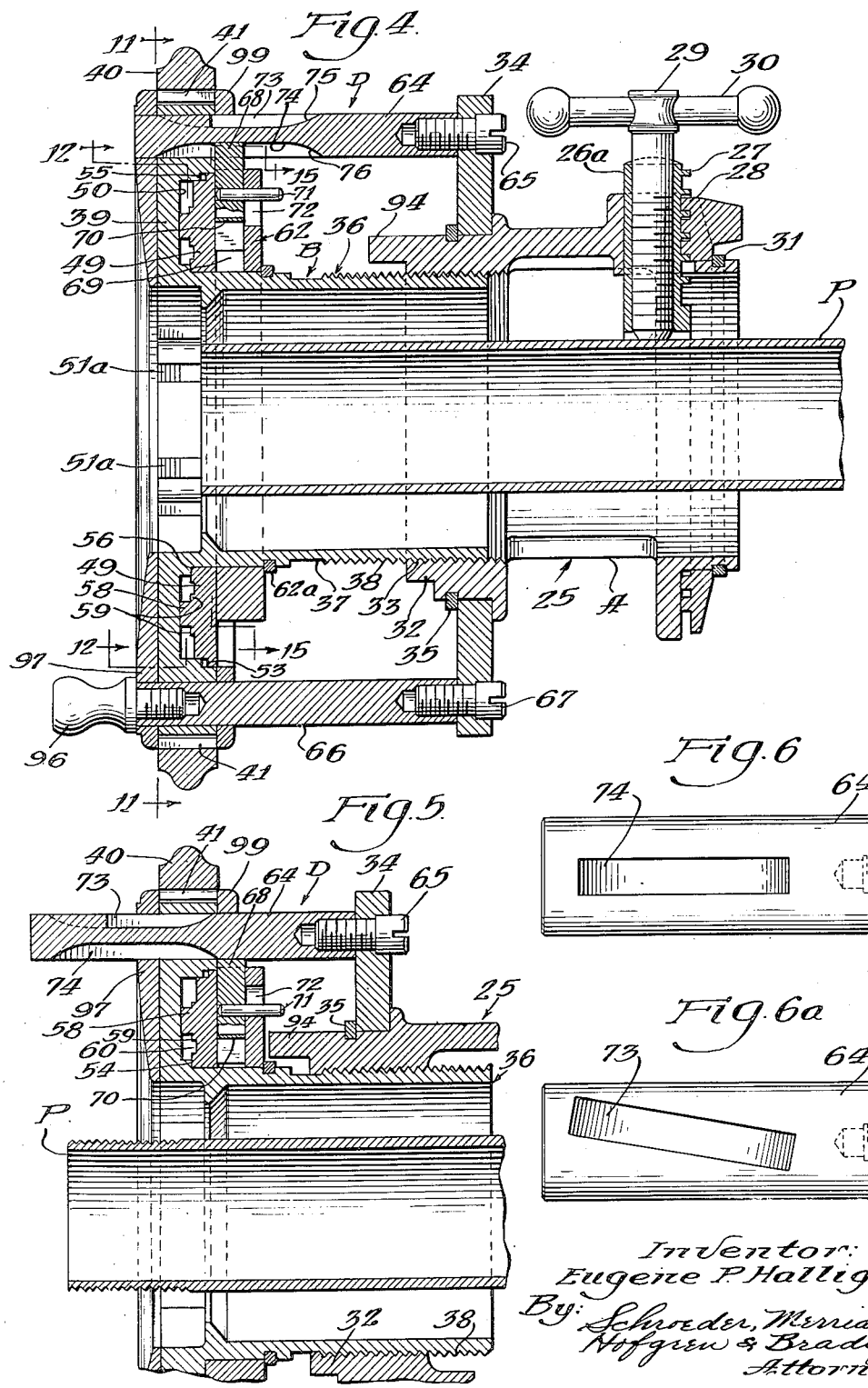

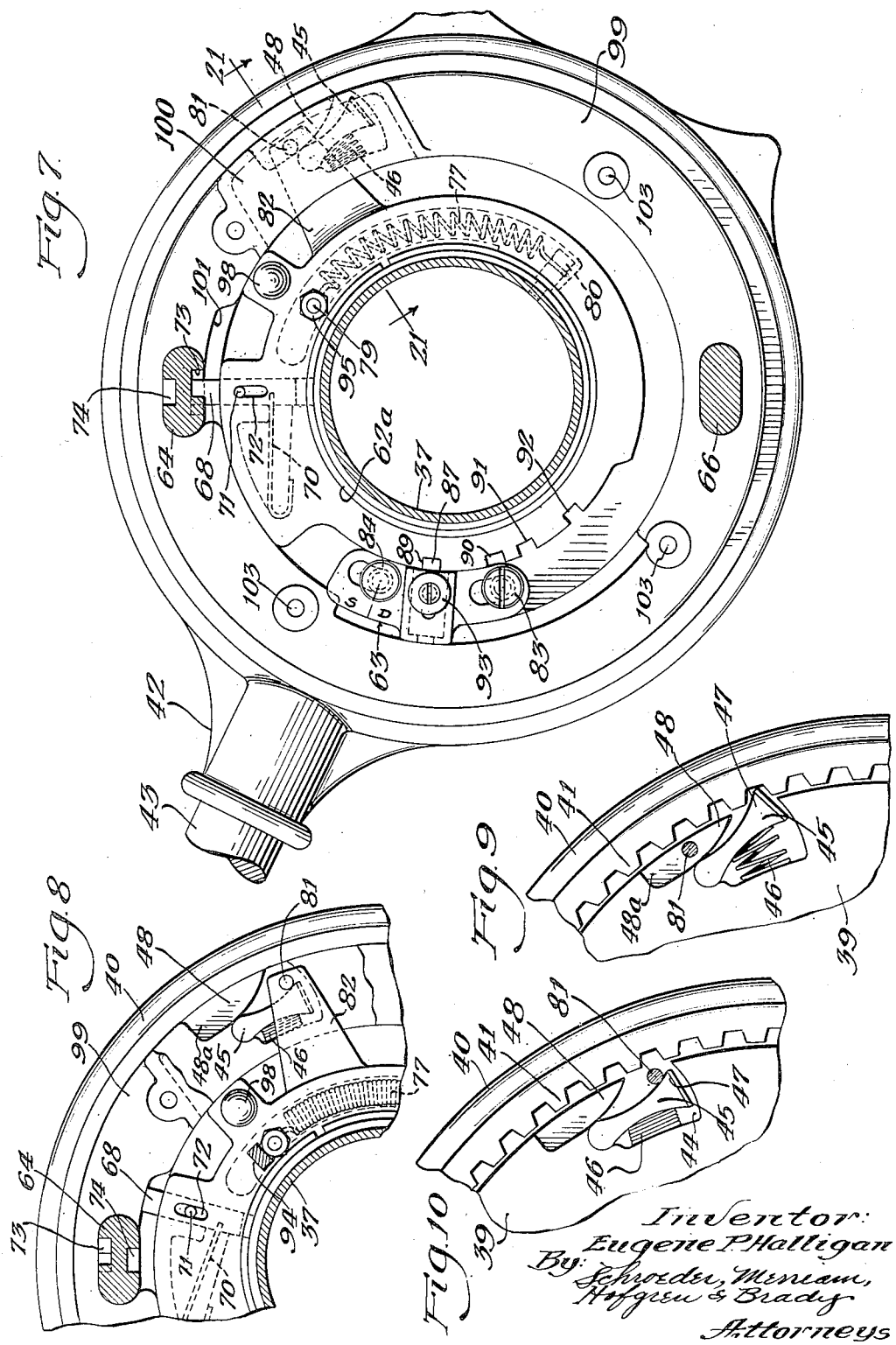

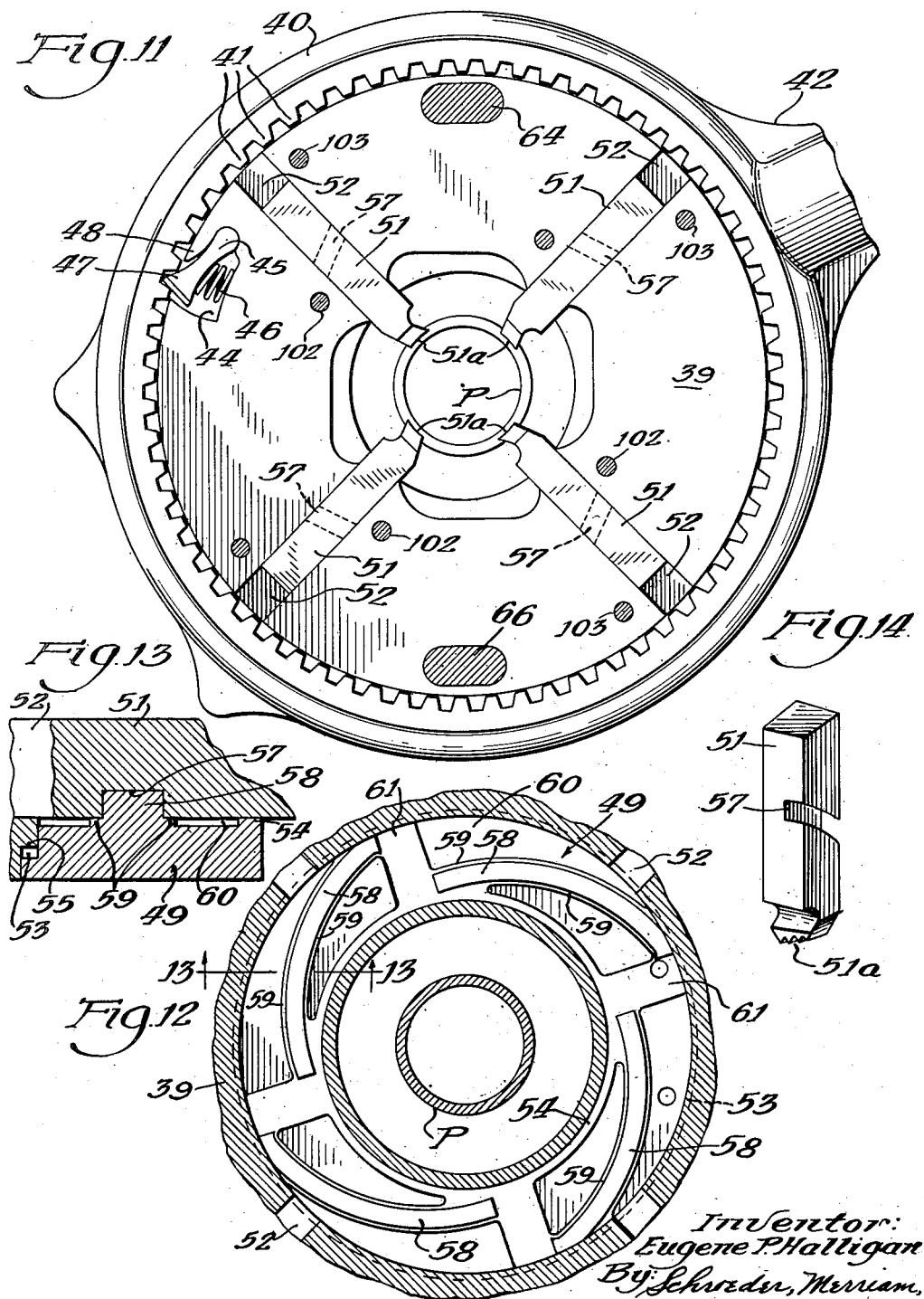

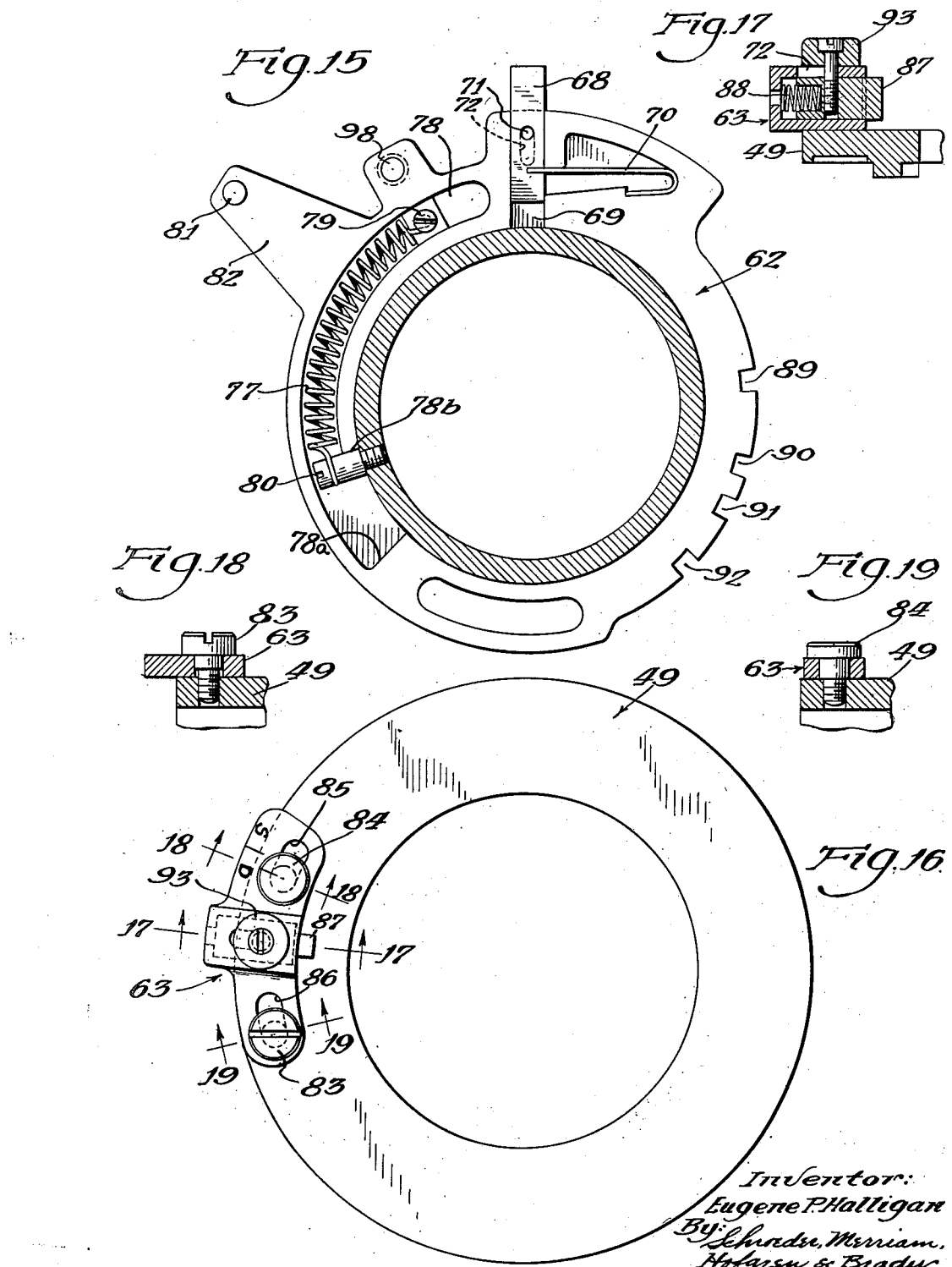

March 3, 1953  E. P. HALLIGAN  2,629,886
THREAD CUTTER
Filed Jan. 19, 1950　　　　　　　　　　　　　7 Sheets—Sheet 7
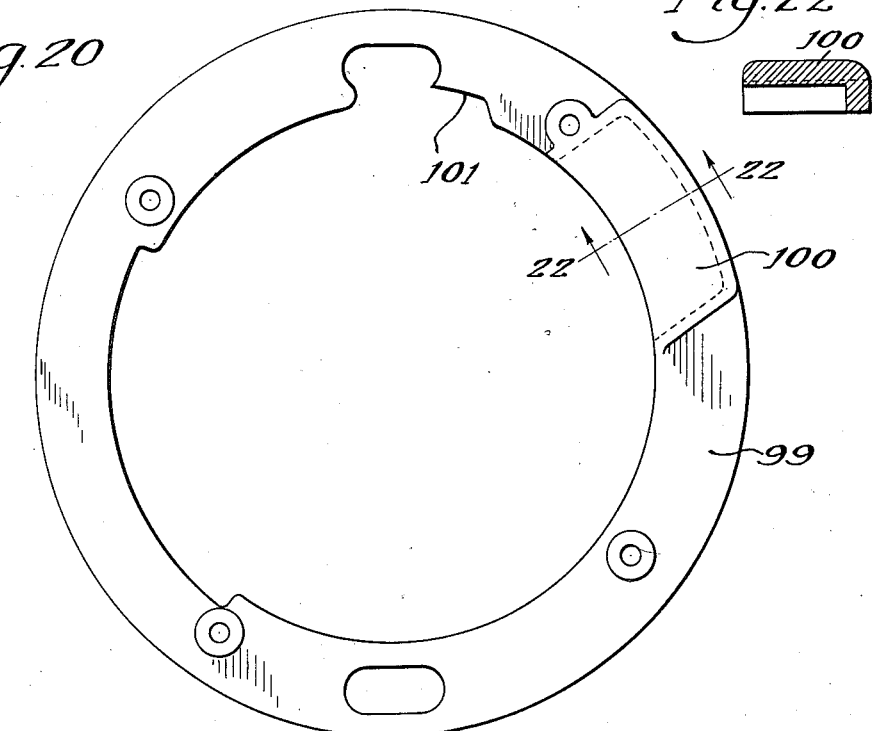
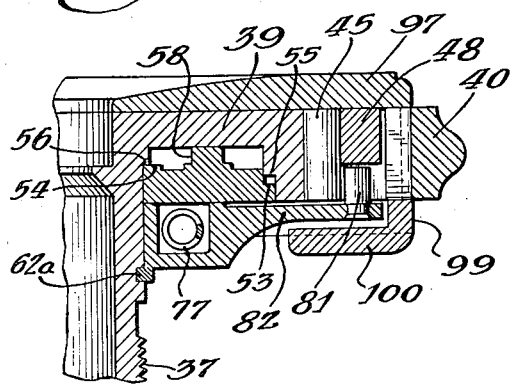
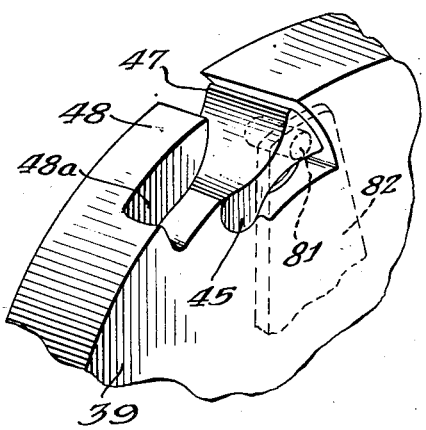
Inventor:
Eugene P. Halligan
By: Schroeder, Merriam, Hofgren & Brady
Attorneys Patented Mar. 3, 1953

2,629,886

UNITED STATES PATENT OFFICE 2,629,886

THREAD CUTTER

Eugene P. Halligan, Chicago, Ill., assignor to Nye Tool Company, a corporation of Illinois Application January 19, 1950, Serial No. 139,349

16 Claims. (Cl. 10—120.5)

This invention relates to an improved thread cutter, and in particular it relates to a thread cutter of the receding type.

The primary object of the invention is to provide a portable thread cutter which is of simple and rugged construction, and which is easy to use.

A further object of the invention is to provide a portable receding thread cutter which has automatic means for simultaneously retracting the chasers and stopping the rearward travel of the cuter body at the end of a thread cutting operation.

Yet another object is to provide a thread cutter which may be readily set to cut either straight or taper threads on several different sizes of pipe, and which may be set to cut deep or shallow threads on pipe of any of the several sizes.

Still a further object is to provide a thread cutter which may be quickly reset in performing a series of cutting operations.

An additional object is to provide a thread cutter which has an emergency disconnect to positively disengage the drive pawl in the event of failure of the automatic disengaging mechanism.

The invention is illustrated in the accompanying drawings, in which:

Fig. 1 is a side elevation of a thread cutter embodying the invention, in cutting position on a piece of pipe which is mounted in the head stock of a lathe; Fig. 2 is a front end elevation of the cutter; Fig. 3 is a rear end elevation thereof; Fig. 4 is a section taken as indicated on the line 4—4 of Fig. 1 as seen at the beginning of a cutting operation; Fig. 5 is an enlarged fragmentary section similar to Fig. 4, as seen after cutting a straight thread; Figs. 6 and 6a are front and rear elevations of the grooved guide post to show the two control grooves therein; Fig. 7 is a section taken as indicated on the line 7—7 of Fig. 1 with the cam control ring in cutting position and the grooved guide post set for a taper cut; Fig. 8 is a fragmentary sectional view similar to Fig. 7, but with the flanged back ring removed to show a portion of the cam control ring, drive pawl and drive pawl trip after completion of a cutting operation and with the grooved guide post set for a stright cut; Figs. 9 and 10 are enlarged, fragmentary sectional views of the drive pawl, drive ratchet ring and drive pawl trip shown, respectively, during and after a cutting operation; Fig. 11 is a section taken as indicated on the line 11—11 of Fig. 4; Fig. 12 is a fragmentary section taken as indicated on the line 12—12 of Fig. 4 showing the cam plate in front elevation; Fig. 13 is an enlarged fragmentary section taken as indicated on the line 13—13 of Fig. 12; Fig. 14 is a perspective of a chaser; Fig. 15 is a section taken as indicated on the line 15—15 of Fig. 4, showing the cam control ring in front elevation; Fig. 16 is a rear elevation of the chaser cam plate showing the detail of the chaser indexing member; Fig. 17 is a section taken as indicated on the line 17—17 of Fig. 16; Fig. 18 is a section taken as indicated on the line 18—18 of Fig. 16; Fig. 19 is a section taken as indicated on the line 19—19 of Fig. 16; Fig. 20 is a plan view of the flanged back ring; Fig. 21 is an enlarged fragmentary section taken as indicated on the line 21—21 of Fig. 7; Fig. 22 is an enlarged fragmentary section taken as indicated on the line 22—22 of Fig. 21; and Fig. 23 is an enlarged fragmentary perspective of the cutter body pawl recess and associated parts.

The thread cutter consists generally of a work holder A which is adapted to be clamped to a pipe P, the pipe being fastened in the head stock of a lathe L to be rotated. The pipe holder has a threaded longitudinal portion providing a lead screw to receive a cuter body assembly B which includes a cutter body having a threaded barrel to engage said lead screw, a ratchet ring journalled on the forward end of the cutter body and engaged by a spring pressed drive pawl mounted in the cutter body, a flanged ring on the back of the cutter body, and a front cover plate on the front of the cutter body. The ratchet ring is provided with a conventional handle socket in which a handle may be inserted to about against the lathe bed and lock the ratchet ring against rotation. The pawl engaging the ratchet ring thus locks the remainder of cutter body assembly B against rotation, so that when the lathe L is operated to rotate the pipe P and the pipe holder A, the cutter body assembly B is drawn rearwardly on the lead screw.

A chaser assembly C includes a chaser cam plate mounted for limited rotation in an annular recess in the cutter body and four chasers mounted for radial motion in grooves in the cutter body and engaged by a cam face on the chaser cam plate for radial motion in response to rotation of the cam plate. Thus rotation of the cam plate determines the degree of separation of the chasers which may be set to thread pipe of different sizes.

A cam and drive control assembly D controls both the radial positioning of the chasers and the engagement or disengagement of the pawl with the ratchet ring. The cam control assembly includes a guide post which is mounted on an idler ring on the forward part of the work holder and projects forwardly through an aperture in the periphery of the cutter body, said guide post having two longitudinal control grooves, and a cam control ring rotatably mounted upon the chaser cam plate and having a spring pressed control finger to engage one of said control grooves. A disconnect spring carried in a recess in the cam control ring tends to rotate said ring in the direction of rotation of the pipe, so that when the spring pressed control finger is disengaged from either of the control grooves on the guide post the cam control ring rotates under the impulse of the spring to carry a pawl trip into contact with the pawl and kick it out of engagement with the ratchet ring. When this takes place, the cutter body commences to rotate with the pipe holder and the rearward motion of the cutter body is stopped, thus stopping the cut.

The cam control ring is provided with a plurality of indexing notches which may be selectively engaged by a spring pressed indexing plunger which is mounted on a size adjuster plate secured to the back of the chaser cam plate. The indexing notch in which the indexing plunger is engaged determines the degree of separation of the chasers, and when the indexing plunger is engaged with an indexing notch the cam plate and the cam control ring rotate as a unit so that rotation of the cam control ring to kick out the drive pawl likewise retracts the chasers radially out of engagement with the pipe.

Auxiliary drive stop means are provided in case of failure of the disconnect spring, as will be fully described hereafter.

Referring to the drawings in greater detail, a work holder A having a cagelike holder body 25 is provided with a work clamp consisting of a plurality of radially movable pipe gripping jaws 26 which have longitudinal rack portions 27 to engage a spiral feed screw on a pipe holder gauge ring 28 by means of which the pipe holder jaws 27 may be moved radially to grip a pipe P upon which a thread is to be cut. As best seen in Fig. 4, one of the pipe gripping jaws, designated 26a, is hollow and is internally threaded to receive an independently adjustable screw 29 having a turning bar 30 by means of which it may be screwed in and out with respect to the hollow pipe holder jaw 26a. Thus the jaws 26 and 26a are movable as a unit by means of the gauge ring 28, and the screw 29 may be separately tightened to give the pipe holder A a better grip upon the pipe P. The pipe holder gauge ring 28 is retained in position on the pipe holder by means of a split rear retainer ring 31 which seats in a suitable annular groove in the pipe holder.

The cagelike body member 25 of the pipe holder A has a forwardly projecting longitudinal sleeve 32 which has an internal thread forming a lead screw 33. An idler ring 34 is rotatably mounted on the sleeve portion 32 of the pipe holder A, where it is retained between a shoulder and a split front retainer ring 35 which is mounted in a suitable annular groove in the pipe holder sleeve 32.

The cutter body assembly B includes a cutter body, indicated generally at 36, which has a barrel 37 provided with an external thread 38 to engage the lead screw 33 in the pipe holder, and has a wide annular flange 39 at its forward end, and a ratchet ring 40 having internal teeth 41 is journalled on the flange 39. A handle socket 42 on the ratchet ring is adapted to receive a handle 43 so that when the cutter is being used with a lathe or similar turning device the handle may abut against the lathe bed or other base member and lock the ratchet ring 40 against rotation. In the periphery of the flange 39 is a hook-shaped drive pawl recess 44 in which is pivotally mounted a drive pawl 45. A pawl spring 46 urges the pawl 45 outwardly so that its forward edge 47 projects beyond the periphery of the cutter body flange 39 and into engagement with the teeth 41 of the ratchet drive ring. The outward movement of the drive pawl 45 is limited by a tongue 48 which partially closes the forward half of the pawl recess 44, leaving a drive pawl trip recess 48a to the rear of the tongue. It is apparent that when the ratchet ring 40 is locked against rotation by the handle 43 abutting against the lathe bed, the engagement of the pawl 45 with the teeth 41 of the ratchet ring serves to lock the cutter body against rotation also. Thus, when the pipe P is rotated with the head stock of the lathe L the cutter body assembly B is drawn rearwardly on the lead screw 33.

As best seen in Figs. 12 to 14, the chaser assembly C of the device comprises an annular chaser cam plate 49 which is rotatably mounted in an annular cam plate recess 50 in the back of the cutter body flange 39, and a set of chasers 51 which are mounted for radial movement in chaser slots 52 in the face of the cutter body 36. The annular chaser cam plate 49 has an outer peripheral shoulder 53 which is spaced slightly from the surface of the cam plate recess, and an inner peripheral shoulder 54 by which it is supported upon a complementary shoulder 56 at the inner margin of the cam plate recess 50. The chasers 51 have threaded cutting teeth 51a at their inner ends, and the rear surfaces of the chasers project into the cam recess 50 so that arcuate slots 57 therein are engaged by arcuate cam ridges 58 on the cam plate 49 whereby rotation of the cam plate causes radial movement of the chasers. The chasers are supported upon the inner shoulder 54 of the cam plate and upon a pair of shoulders 59 which flank the cam ridges 58. The space adjacent the flanking shoulders 59 is recessed, as seen at 60. The cam plate also has a set of radial surfaces 61 between adjacent cam ridges 58 to facilitate insertion and removal of the chasers.

Cam and drive control mechanism D includes a cam control ring 62, and a size adjuster plate 63, both of which are mounted on the rear of the chaser cam plate 49, and a guide post 64 which is secured to the idler ring 34 by means of a screw 65 and projects forwardly through a peripheral aperture in the flange 39 of the cutter body 36. A second guide post 66, which is not normally a part of the control mechanism D, is secured to the idler ring 34 by means of a screw 67, and projects through a second aperture in the flange 39 of the cutter body.

The cam control ring 62 is rotatable with respect to the cam plate 49, and both said members are retained in position on the cutter body 36 by means of a split retaining ring 62a engaged in a suitable groove in the cutter body barrel 33. As best seen in Figs. 7 and 15, a control finger 68 which is slidably mounted in a recess 69 in the control ring 62 extends beyond the outer margin of said plate and is urged outwardly by a spring 70. Outward travel of the finger 68 is limited by a pin 71 which projects rearwardly through a slot 73 in the control ring 62 and provides a handle by means of which the finger 68 may be manually retracted. Referring particularly to Fig. 7 the control finger 68 engages a control groove 73 or a second control groove 74 in the guide post 64, the groove which is engaged by the finger depending upon the position of the guide post, which may be axially rotated to place either of said control grooves in position to be engaged by the finger 68. As best seen in Figs. 4 and 5, the control grooves 73 and 74 have inclined rear surfaces 75 and 76 respectively, which cooperate with the surface forming the end of the control finger 68 to disengage the finger from the slot as it approaches the rear end of either of said control grooves during the rearward travel of the cutter body assembly B. When the control finger 68 thus rides out of the control grooves, it frees the cam control ring 62 for rotation.

As best seen in Fig. 15, a tension disconnect spring 77 is mounted in an arcuate recess 78 in the cam control ring 62 and is fastened at its ends to a spring stud 79 in the control ring and to a second spring stud 80 in the barrel 37 of the cutter body 36. The spring stud 79 extends through the rear wall of the cam control ring 62 to receive a retaining nut 95. The disconnect spring 77 is tensioned so as to rotate the cam control ring 62 in the direction of rotation of the pipe P and pipe holder 25, which is also the direction of rotation of the cam plate 49 to retract the chasers 51. As best seen in Figs. 7 to 10, when the control finger 68 rides out of the rear of either of the control grooves 73 or 74 the disconnect spring 77 rotates the cam control plate 62 so as to bring a drive pawl trip 81, which is mounted on a trip arm 82 of the control ring and extends into the pawl trip recess 48a, into contact with the drive pawl 45 and kick the pawl out of engagement with the teeth 41 of the ratchet ring 40, as is clearly shown in Figs. 8 and 10. This frees all the parts of the pipe cutter except the ratchet ring 40 for rotation with the work holder 25, and stops the rearward feed of the cutter body assembly. Rotation of the cam control ring 62 in both directions is limited by the arcuate recess 78. To reset the chasers for a new cut, the cam plate and cam control ring are rotated so as to reengage the control finger 68 in either of the control grooves 73 or 74, as will be described in more detail hereafter. In case the control finger should fail to engage a control groove, the spring stud 80 will butt against the end surface 78a of the arcuate recess 78, and thus prevent overstretching of the disconnect spring 77. When the control finger 68 rides out of a control groove to release the control ring for rotation at the end of a cutting operation (as previously described), rotation of the control ring is limited by the shoulder 78b of the arcuate recess 78 butting against the spring stud 80. Thus the strain of stopping the rotation is not thrown upon the pawl trip 81 or the control finger 68, both of which are relatively light members.

The size adjuster plate 63 is secured to the rear surface of the cam plate 49 by means of a pair of mounting screws 83 and 84 which extend through slots 85 and 86 in said size adjuster plate, and an indexing plunger 87 slidably mounted on said plate 63 is urged by a spring 88 into engagement with one of a series of indexing notches 89, 90, 91 and 92 in the periphery of the cam control plate 62. An indexing handle 93, projecting upwardly from the indexing plunger 87, permits said plunger to be manually retracted against the tension of the spring 88 so that it may be selectively engaged in any of the aforesaid indexing notches. When the indexing plunger 87 is engaged in one of the indexing notches it locks the chaser cam plate 49 and the cam control ring 62 together so that they move as a unit. Thus, when the disconnect spring 77 operates to rotate the cam control ring 62 so as to kick out the drive pawl 45, the cam plate 49 also rotates and retracts the chasers 51 to disengage them from the pipe P. This positively stops the thread cutting operation and simultaneously frees the chasers so that the thread cutter may be removed from the pipe.

The indexing notches 89, 90, 91 and 92 are so placed that engagement of the indexing plunger 87 with the appropriate notch sets the chasers for thread cutting engagement with a 1″, a 1¼″, a 1½″ or a 2″ pipe. Preferably the outer surface of the control ring 62 is appropriately marked to indicate which notch will index the chasers to cut a pipe of any desired size. It is plain from the foregoing description of the indexing members that they are so arranged as to set the chasers to cut a thread of standard depth in a pipe. If it is desired to change the depth of the thread, the mounting screws 83 and 84 may be loosened and the size adjuster plate 63 may be moved circumferentially on the screws by reason of the slots 85 and 86. The plate 63 may then be tightened on the cam control plate and the depth of cut thus varied. The top of the size adjuster plate 63 is marked with the letters "S", "I" and "D" to show the proper settings for shallow, intermediate and deep cuts, and an indexing line on the screw 84 shows the proper alinement of the plate 63 for each type of thread.

As best seen in Figs. 6 and 6a, the control groove 73 in the guide post 64 is inclined with respect to the longitudinal axis of said guide post and thus with respect to the line of travel of the cutter body assembly, while the control groove 74 is parallel to said axis. Thus, if the control finger 68 is engaged with the parallel control groove 74 there is no rotational motion of the cam control ring 62 and the cam plate 49 during the progress of a cut. Accordingly, the cutter teeth 51a of the chasers remain the same distance apart throughout the cut and cut a straight thread on the pipe P. On the other hand, if the control finger 68 is engaged with the inclined control groove 73 the inclination of the groove causes a slight, uniform rotation of the cam control ring 62 and came plate 49 during the cut so as to slightly retract the chasers 51 and produce a taper thread on the pipe P. The guide post 64 may be axially rotated 180° so as to bring either the inclined control groove 73 or the parallel control groove 74 selectively into position to be engaged by the control finger 68, whereby the cutter may readily be adapted to form either a straight or a taper thread.

The thread cutter is provided with an auxiliary drive disconnect mechanism which functions to stop the rearward feed of the cutter body assembly B if the disconnect spring 77 fails to function. As best seen in Fig. 4 a positive disconnect finger 94 projects forwardly from the sleeve 32 of the pipe holder 25, in alinement with the rearwardly projecting spring stud 79 and nut 95 on the cam control ring 62. If the cam control ring 62 fails to rotate when the control finger 68 is disengaged from the control groove 73 or 74, whether by reason of breakage of the disconnect spring 77 or some other cause, the cutter body assembly B will continue to feed rearwardly until the rotation of the positive disconnect finger 94 brings it into contact with the nut 95 on the stud 79. The disconnect finger 94 will then rotate the cam control ring 62 and the cam plate 49 to disengage the drive pawl 45 from the ratchet drive ring 40 and to retract the chasers 51 so as to disengage them from the pipe P.

In order to reset the pipe cutter at the end of a cutting operation, a spin-back-knob 96 is screwed to the forward end of the second guide post 66 and has its base extending slightly beyond the margins of said post. The operator may return the cutter assembly B to its original position ready to receive a new piece of pipe for threading by spinning the entire unit, including the body member 36 and associated parts and the idler ring 34 and guide posts 64 and 66, in a counterclockwise direction. A front cover plate 97 is fastened to the cutter body 36 by rivets 102 and screws 103; and when the cutter body assembly B is returned to its initial position, the extending base of the spin-back-knob 96 abuts against the front cover plate 97 so as to stop the return motion of the cutter body assembly.

In order to reset the chasers and reengage the control finger 68 in either of the control grooves 73 or 74, the operator may grasp a cocking knob 98 and rotate the cam plate and cam control ring 62 counterclockwise as a unit. A back flange ring 99, which is secured to the back of the flange 39 by the screws 103 which extend entirely through said flange, has a recess 100 to receive the extending pawl trip arm 82 of the cam control ring, and is provided with a guide face 101 adjacent the guide post 64 which guides the spring pressed control finger 68 into the control groove.

After the cutter body assembly has been spun back to its initial position, and the chaser cam plate 49 and cam control ring 62 have been rotated to reengage the control finger 68 with the control grooves 73 or 74, the cutter is ready to be mounted upon a new piece of pipe to perform a new cutting operation.

The foregoing detailed description is given for clearness and understanding only and no unnecessary limitations are to be understood therefrom, for variations will be obvious to those skilled in the art.

I claim:

1. A thread cutter comprising: a work holder having a clamp and a threaded longitudinal portion; a cutter body having a threaded barrel engaging said threaded portion of said work holder; a ratchet ring journalled on said cutter body; a pawl on the cutter body urged into engagement with said ratchet ring; a plurality of radially disposed chasers slidably mounted in said cutter body; a chaser cam plate rotatably mounted on the cutter body in operative engagement with said chasers to control their radial position; a guide post on the work holder extending toward said cutter body, said post having a longitudinally extending groove; a spring pressed control finger mounted on said chaser cam plate to engage and slide rearwardly in said groove to control rotation of the chaser cam plate, said control finger and groove having cooperating portions to free the finger at the rear of the groove whereby said chaser cam plate may rotate freely; a pawl trip on said chaser cam plate and stop mechanism constructed and arranged to rotate the chaser cam plate relative to the cutter body to retract the chasers and carry said pawl trip against the pawl to disengage said pawl from said ratchet ring when said control finger is freed from the groove.

2. A thread cutter according to claim 1 wherein the control finger is part of a cam control ring which is rotatably mounted on the chaser cam plate, and the control ring and cam plate are provided with open indexing notches and a cooperating indexing plunger.

3. A thread cutter according to claim 1 wherein the control finger is part of a cam control ring which is rotatably mounted on the chaser cam plate, and is provided with a plurality of spaced indexing notches, and a size adjuster plate on the chaser cam plate is slidable circumferentially with respect to the cam control ring and has an indexing plunger for selective engagement with said indexing notches.

4. A thread cutter according to claim 1 wherein the mechanism for rotating the chaser cam plate relative to the cutter body includes a disconnect spring secured to the cutter body and operatively connected to said cam plate.

5. A thread cutter according to claim 1 wherein the control finger is part of a cam control ring which is rotatable with respect to the cam plate and is adjustable thereon by means of a plurality of indexing notches and a cooperating spring pressed indexing finger, and the mechanism for rotating the chaser cam plate relative to the cutter body includes a disconnect spring secured to the cutter body and to the cam control ring.

6. A thread cutter according to claim 1 wherein the mechanism for moving the chaser cam plate relative to the cutter body comprises a forwardly extending disconnect finger on the rotating pipe holder which is positioned to strike a rearwardly projecting element secured to the cam plate when said pipe holder reaches a predetermined position with respect to said cam plate.

7. A thread cutter according to claim 1 wherein the longitudinally extending groove in the guide post slopes upwardly to the surface of the post at its rear end to disengage the control finger from the groove.

8. A thread cutter according to claim 1 wherein a reset guide surface adjacent the guide post is flush with the adjacent surface of the post to direct the control finger into the longitudinally extending groove on the guide post, when the cam plate and control member are rotated so as to move the control finger toward the control groove.

9. A thread cutter comprising: a work holder having a clamp and a threaded longitudinal portion; a cutter body having a threaded barrel engaging said threaded portion of said work holder; a ratchet ring journalled on said cutter body; a pawl on the cutter body urged into engagement with said ratchet ring; a plurality of radially disposed chasers slidably mounted in said cutter body; a chaser cam plate rotatably mounted on the cutter body in operative engagement with said chasers to control their radial position; a guide post on the work holder extending toward said cutter body, said post having a longitudinally extending groove; a spring pressed control finger mounted on said chaser cam plate to engage and slide rearwardly in said groove to control rotation of the chaser cam plate, said control finger and groove having cooperating portions to free the finger at the rear of the grooves whereby said chaser cam plate may rotate freely; a pawl trip on the chaser cam plate; a disconnect spring urging the chaser cam plate in the direction of rotation of the pipe so as to retract the chasers and carry said pawl trip against the pawl to disengage said pawl from said ratchet ring when said control finger is freed from the groove; a rearwardly projecting lug on the chaser cam plate; and a forwardly projecting positive disconnect finger on the work holder positioned to strike said lug on said chaser cam plate to rotate the cam plate in the event of failure of the disconnect spring.

10. A thread cutter comprising: a work holder having a clamp and a threaded longitudinal portion; a cutter body having a threaded barrel engaging said threaded portion of said work holder; a ratchet ring journalled on said cutter body; a pawl on the cutter body urged into engagement with said ratchet ring; a plurality of radially disposed chasers slidably mounted in said cutter body; a chaser cam plate mounted for limited rotation on the cutter body and in operative engagement with said chasers to control their radial position; a guide post on the work holder extending through an aperture in said cutter body, said guide post having an axially disposed groove on one face and a groove biased with respect to its axis on another face and being movable to bring either of said grooves selectively adjacent said chaser cam plate; a cam control ring rotatably mounted on the chaser cam plate, said ring having a projecting pawl trip and a plurality of indexing notches; a spring pressed control finger on said cam control ring to engage the front portion of the groove in the guide post which is positioned adjacent said cam plate and be disengaged by the rear portion of said groove; a disconnect spring secured to the cutter body and to the cam control ring to rotate said ring in the direction of rotation of the work holder so as to cause said pawl trip on the cam control ring to disengage said pawl from said ratchet ring when said control finger is disengaged from the groove; and an indexing plunger on the chaser cam plate selectively engageable with said indexing notches in the cam control ring to lock said chaser cam plate to said cam control ring and retract the chasers when the cam control ring is rotated by said disconnect spring.

11. A thread cutter according to claim 10 wherein a lug projects rearwardly from the cam control ring and a positive disconnect finger projects forwardly from the work holder to strike said lug on the cam control ring to rotate said ring in the event of failure of the disconnect spring to effect said rotation.

12. A thread cutter according to claim 1 wherein there is a spring stud on the cutter body, the control finger is part of a cam control ring which is secured to the cam plate and which is provided with an arcuate disconnect spring recess having a vacuity adjacent one end to accommodate said spring stud, the mechanism for moving the chaser cam plate relative to the cutter body includes a tension disconnect spring in said recess secured to said stud and to a pin on the cam control ring, and the rotation of the cam plate in both directions is limited by abutment of the margins of said vacuity against said stud.

13. A thread cutter comprising: a work holder having a clamp and a lead screw; a cutter body which has a thread engaging said lead screw; a drive member; a movable element for engaging said cutter body and said drive member together to move the cutter body rearwardly on the lead screw; a plurality of chasers slidably mounted in the cutter body; a chaser cam member movably mounted on the cutter body in engagement with the chasers to control their position; a control finger on the chaser cam member; a guide member on the work holder having a surface engaging said control finger to control movement of the chaser cam member, said control finger and guide member having cooperating surfaces to free the finger from the guide member at the end of a cutting operation; a trip on the chaser cam member positioned to strike said movable element to disengage the cutter body and drive member; and mechanism constructed and arranged to move the chaser cam member on the cutter body to retract the chasers and drive said trip against the movable element to free the cutter body from the drive member.

14. A tool comprising a workholder member by which the tool may be fixed to a workpiece, a driven member having screw threads threadably engaging said workholder member, said driven member being adapted to be screwed into said workholder thereby, a driving member normally in driving engagement with said driven member by means of a pawl-and-tooth ratchet means, a ring means rotatably driven by said driven member, pawl release means carried by said driven member, and means formed on said ring means adapted to engage said pawl release means to release said driving engagement at a predetermined location of said ring means relative to said driven member.

15. A thread cutter comprising: a work holder having a clamp and a lead screw; a cutter body which has a thread engaging said lead screw; a drive member; pawl and tooth ratchet means for normally retaining said drive member and said cutter body in driving engagement to drive the cutter body rearwardly on the lead screw; ring means toward which the cutter body moves as it is driven rearwardly on the lead screw, said ring means having a member normally engaging the cutter body; and pawl release means on the cutter body which is normally in engagement with said member on said ring means and which is disengaged therefrom at a predetermined position of the ring means relative to the cutter body to release said driving engagement.

16. The thread cutter of claim 15 in which the pawl release means is rotatably mounted on the cutter body and is locked against rotation by its engagement with said member on the ring means.

EUGENE P. HALLIGAN.

REFERENCES CITED

The following references are of record in the file of this patent:

UNITED STATES PATENTS

| Number | Name | Date |
| --- | --- | --- |
| 985,168 | Hart | Feb. 28, 1911 |
| 1,005,147 | Borden et al. | Oct. 10, 1911 |
| 1,153,835 | Walter | Sept. 14, 1915 |
| 1,616,649 | Borden | Feb. 8, 1927 |
| 1,999,207 | Pealer | Apr. 30, 1935 |
| 2,100,376 | Breitenstein | Nov. 30, 1937 |
| 2,225,507 | Overguard | Dec. 17, 1940 |